United States Patent [19]

Doles

[11] Patent Number: 5,391,606
[45] Date of Patent: Feb. 21, 1995

[54] EMISSIVE COATINGS FOR INVESTMENT CASTING MOLDS

[75] Inventor: Ronald S. Doles, La Grange Park, Ill.

[73] Assignee: Nalco Chemical Company, Naperville, Ill.

[21] Appl. No.: 130,973

[22] Filed: Oct. 4, 1993

Related U.S. Application Data

[63] Continuation-in-part of Ser. No. 907,687, Jul. 2, 1992, abandoned.

[51] Int. Cl.$^6$ .............. C08J 7/06; C08K 3/18; C08K 3/22; C08L 21/00
[52] U.S. Cl. .................. 524/430; 523/139; 523/140; 523/141; 524/432; 524/433; 524/437; 524/441; 524/436; 524/494; 501/32; 106/38.9; 164/24; 164/516; 164/517; 164/518; 164/519
[58] Field of Search ............. 524/436, 492, 493, 494, 524/430, 433, 432, 437, 441, 442, 445, 446; 523/139, 140, 141; 501/32; 106/38.9; 164/24, 516, 517, 518, 519

[56] References Cited

U.S. PATENT DOCUMENTS

| | | | |
|---|---|---|---|
| 3,993,844 | 11/1976 | Kiger et al. | 428/428 |
| 4,966,225 | 10/1990 | Johnson et al. | 164/519 |
| 4,977,024 | 12/1990 | Morita et al. | 428/404 |

Primary Examiner—Paul R. Michl
Assistant Examiner—U. K. Rajguru
Attorney, Agent, or Firm—Robert A. Miller; James J. Drake

[57] ABSTRACT

Emissive compositions are described that can be applied as a coating to the surface of an investment casting mold to increase or decrease the rate of cooling of a casting within the mold. A coating that decreases the rate of cooling of an investment casting within an investment casting mold may comprise a compound having an emissivity less than the emissivity of the mold; a high temperature glass-forming material and a solvent to make a slurry. Similarly, a coating that increases the rate of cooling may comprise a compound having an emissivity greater than the emissivity of the mold; a low temperature glass-forming material and a solvent to make a slurry. Also disclosed in a method of investment casting wherein an emissive composition is applied to the investment casting mold.

13 Claims, 4 Drawing Sheets

EMISSIVE COATINGS FOR INVESTMENT CASTING MOLDS

This Application is a continuation-in-part of U.S. patent application Ser. No. 07/907,687, filed Jul. 2, 1992, now abandoned, the disclosure of which is incorporated herein by reference.

TECHNICAL FIELD

This invention relates to emissive compositions that can be applied to an investment casting mold to either increase or decrease the cooling rate of an investment casting within the mold. This invention also relates to investment casting molds that have been coated with an emissive composition and to a method for the use of an emissive composition in investment casting.

BACKGROUND OF THE INVENTION

Ceramic investment casting is a specialized form of investment casting that is used to produce high quality metal articles that meet relatively close dimensional tolerances. Investment casting has also been called lost wax, lost pattern, and precision casting. Typically, an investment casting is made by first constructing a thin-walled ceramic mold called an investment casting shell into which a molten metal can be introduced.

Shells are usually constructed by first making a facsimile or pattern from a meltable substrate of the metal object to be made by investment casting. Suitable meltable substrates may include, for example, wax, polystyrene or plastic.

Next, a ceramic shell is formed around the pattern. This may be accomplished by dipping the pattern into a slurry containing a mixture of liquid refractory binders such as colloidal silica or ethyl silicate, plus a refractory flavor seed as quartz, fused silica, zircon, alumina and aluminosilicate and then sieving dry refractory grains onto the freshly dipped pattern. The most commonly used dry refractory grains include quartz, fused silica, zircon, alumina and aluminosilicate.

The steps of dipping the pattern into a refractory slurry and then sieving onto the freshly dipped pattern dry refractory grains may be repeated until the desired thickness of the shell is obtained. However, it is preferable if each coat of slurry and refractory grains is air-dried before subsequent coats are applied.

The shells are built up to a thickness in the range of about 3/16 to about ½ of an inch (from about 0.47 to about 1.27 cm). After the final dipping and sieving, the shell is thoroughly air-dried. The shells made by this procedure have been called "stuccoed" shells because of the texture of the shell's surface.

Next, the shell is heated to at least the melting point of the meltable substrate. In this step, the pattern is melted away leaving only the shell and any residual meltable substrate. The shell is then heated to a temperature high enough to vaporize any residual meltable substrate from the shell. Usually before the shell has cooled from this high temperature heating, the shell is filled with molten metal. Various methods have been used to introduce molten metal into shells including gravity, pressure, vacuum and centrifugal methods. When the molten metal in the casting mold has solidified and cooled sufficiently, the casting may be removed from the shell.

The solidification rate of the molten metal in an investment casting mold significantly affects the microstructure, strength and quality of the casting. If the solidification rate is too rapid, the metal may not have enough time to release trapped air and completely fill a mold. If the solidification rate is too slow, the casting may shrink excessively and exhibit a coarse microstructure. These drawbacks, as well as others, may be avoided or minimized by controlling the cooling rate of the molten metal in an investment casting mold.

Currently, some foundries wrap their investment casting molds with high-temperature ceramic fiber blankets in an effort to insulate the casting and decrease the cooling rate of the investment casting within the mold. Wrapping molds with ceramic fiber blankets is a time-consuming process. Moreover, situations where foundry workers may inhale ceramic fibers should be avoided because ceramic fibers are unhealthy to breathe.

On the other hand, to increase the rate of cooling of an investment casting, fans have been used. Each method that is currently used for increasing or decreasing the rate of cooling of an investment casting within the mold has its own particular drawbacks.

SUMMARY OF THE INVENTION

The present invention provides a way of increasing or decreasing the rate of cooling of an investment casting within the mold by application of an emissive composition to the outside of an investment casting mold. Typically, the composition is a slurry and may be sprayed or painted onto an investment casting mold. Alternatively, the investment casting mold may be dipped into an emissive composition.

An emissive composition that decreases the rate of cooling of an investment casting within the mold comprises a compound having an emissivity less than the emissivity of the investment casting mold, a high temperature glass-forming material and a solvent to make slurry.

An emissive composition that increases the rate of cooling of an investment casting within the investment casting mold comprises a compound having an emissivity greater than the emissivity of the investment casting mold, a low temperature glass-forming material and a solvent to make a slurry.

Also provided is a method of investment casting that uses an emissive composition. First, an investment casting shell is formed around a pattern. Then, an emissive coating is applied to the desired portions of the shell. Next, the pattern is removed and the shell heated to prepare it for receiving a molten metal. Molten metal is then introduced into the shell, and the mold with the molten metal allowed to cool. After cooling the casting may be removed from the mold.

DETAILED DESCRIPTION OF THE PREFERRED EMBODIMENTS

Figure 1:
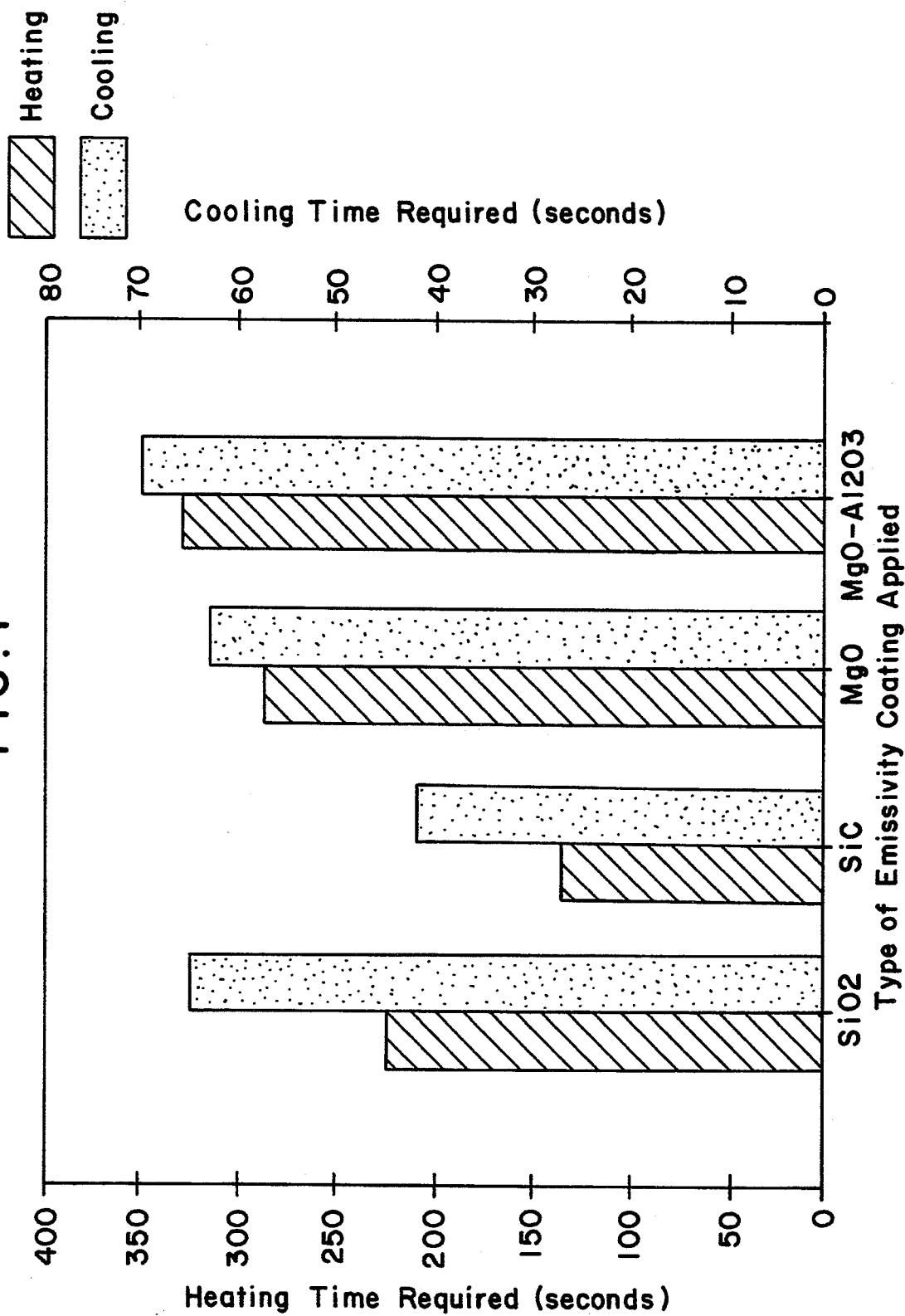
FIG. 1 is a bar graph that shows the relationship between heating and cooling times required in a furnace to attain specific temperatures and different types emissivity coatings applied to external surfaces of the shells.

The present invention provides an emissive composition that may be applied to an investment casting mold to either increase or decrease the rate of cooling of an investment casting within the mold. The present compositions are unique because they include an emissivity compound. If the emissivity of the compound in the emissive composition is greater than the emissivity of the shell, the rate of cooling of the investment casting is increased by the application of a coating of the emissive composition to an investment casting mold. On the other hand, if a compound that has an emissivity less than the emissivity of the casting mold is employed in the composition that is applied to the mold, the cooling rate is decreased, i.e. the composition has an insulative effect. As used herein, the word "emissivity" shall mean the ability of a material to transfer heat to its surroundings.

A composition that decreases the rate of cooling of an investment casting comprises a compound that has an emissivity less than the emissivity of the investment casting mold in an amount in the range of about 5% to about 75%, or more preferably in the range of about 20% to about 60% by weight of the entire composition, a high temperature glass-forming material in an amount in the range of about 1% to about 10% by weight of the entire composition and a solvent in an amount sufficient to produce a slurry.

Compounds that have lower emissivities than the commonly used materials from which investment casting molds are made include, but are not limited to, magnesium oxide, cerium oxide, yttrium, calcium oxide and mixtures thereof. Magnesium hydroxide may also be used as magnesium hydroxide is dehydrated to form magnesium oxide when heated to temperatures above about 650° F. (343° C.). Preferably, the low emissivity compound is magnesium oxide. However, compositions containing magnesium hydroxide are most preferred because slurries containing magnesium oxide tend to solidify during storage, which is undesirable.

A convenient aqueous slurry containing 60% by weight of the entire slurry of magnesium hydroxide can be obtained from the Dow Chemical Company under the trade names MHT60S TM or MHT60XS TM. Aqueous slurries having magnesium hydroxide particles with effective diameters in the range of about 0.6 to about 10 microns are preferred, although particles with diameters of up to 100 microns are satisfactory. In general, the emissive compound, whether insulative or cooling, is a finely divided solid, and preferably, the surface area of the emissive compound is relatively large, which aids in the formation of a slurry.

Compounds such as magnesium chloride, magnesium carbonate, magnesium acetate and magnesium stearate may also be used in the present invention. These magnesium compounds are also converted to magnesium oxide during the investment casting process. Generally, any compound which has an emissivity less than the emissivity of the casting shell may be employed in the present invention so long as the compound is able to withstand the temperatures used in the investment casting process without detrimental change.

The spectral emissivity of a compound may be used a rough guide in choosing a compound having the desired emissivity. The thermal emissivities of various compounds are listed in Touloukain, Y. S. ed. *Thermopysical Properties of High Temperature Solid Materials*. Thermophysical Research Center, Purdue University. New York: MacMillan Co., 196. While useful in selecting compounds with the desired emissivities, spectral emissivities relate only to radiative heat transfer, whereas other heat transfer mechanisms are also involved in the cooling of an investment casting.

A high temperature glass-forming material may also be included in an insulative emissive composition. High temperature glass-forming materials remain solid when heated and fuse at temperatures in the range of about 2800° F. (1,538° C.) to about 3300° F. (1,816° C.) and solidify to form a glass when cooled relatively rapidly. Inclusion of a high temperature glass-forming material in an insulative composition has several functions, including to provide better green strength of the casting mold, to promote adhesion of the composition to the surface of the shell and to help suspend the particulate emissive compound in the slurry. Some examples of high temperature glass-forming compounds include, but are not limited to, silica, alumina, aluminosilicate, zirconla and borosilicate or a mixture of the forgoing. As used herein the word silica includes, but is not limited to, fused silica, fumed silica, and silica fume. Silica fume may be obtained from W. R. Grace under the trade name Force 10,000 TM. Silica fume particles having an effective diameter in the range of about 0.03 to about 0.3 microns are preferred.

It is preferable if a high temperature glass-forming material is present in the range of about 1% to about 10% by weight of the entire composition, and more preferably, in the range of about 2% to about 6% by weight of the entire composition.

A high temperature glass-forming material is preferably included in the emissive composition when the emissive compound is magnesium oxide or when a compound that forms magnesium oxide is used. Magnesium oxide may form low melting eutectic mixtures with the silica in a silica-based casting shell or with any silica in an emissive composition. To avoid this problem, a high temperature glass-forming compound may be added to the composition to help dilute the magnesium oxide, and thus move the composition away from the range in which a low melting eutectic may be formed. The formation of a low melting eutectic mixture is undesirable as the structural integrity of the emissive coating may be undermined.

The most preferred high temperature glass-forming material used in conjunction with magnesium oxide is fused silica. Fused silica also helps to minimize cracking associated with shrinkage of the emissive coating and provides porosity to the dry emissive composition, which facilitates the escape of gases that may be formed in the coating during heating. Typically, in the case of magnesium hydroxide, which gives off steam during heating, it is preferable if fused silica is added in a proportion that is in the range of about 3 to about 6 times the weight of the emissive compound. The presence of fumed silica or silica fume makes the slurry adhere better to the shell, and after heating, produces a stronger insulating coating. Conversely, the relatively larger particles of fumed silica introduce a porosity into the coating that helps to minimize spalling. It is also recognized that more than one type of silica may be used. For example, a mixture of fused silica or silica fume may be employed.

The solvent may be any liquid that does not detrimentally interact with the casting shell or the other components of an emissive composition. In an emissive composition, the solvent acts primarily as a carrier for the emissive compound, and allows the emissive compound to be applied to an investment casting mold. Typically, the solvent is evaporated from the emissive composition upon heating the mold to melt the pattern or vaporize any residual pattern. The most preferred solvent is water. However, organic solvents such as short chain alkyl alcohols, acetone and the like may also be used.

A composition that may be applied to an investment casting that increases the rate of cooling (a cooling composition) may be comprised of a compound having an emissivity that is greater than the emissivity of the casting mold in an amount in the range of about 5% to about 75%, more preferably in the range from about 20% to about 60% by weight of the entire composition; a low temperature glass-forming material in the range of about 1% to about 10%; and a solvent in an amount sufficient to produce a slurry.

A compound that, when applied to a investment casting mold, has the effect of increasing the rate of cooling of the investment casting within the mold may be selected from those compounds that have emissivities higher that the emissivity of the material from which the mold is made. Compounds that have emissivities higher than the most commonly used materials for making casting molds include, but are not limited to, graphite, silicon carbides, silicon nitrides, boron carbides, boron nitrides and metal oxides, such as oxides of titanium, zirconium, iron, chromium, molybdenum, aluminum, nickel, copper, zinc, or mixtures of the forgoing. Preferably, the cooling emissive compound is silicon carbide in a amount in the range of about 20% to about 60% and most preferably in the range of about 40% to about 50% by weight of the entire composition. In selecting cooling emissive compounds, the criteria set forth above with respect to insulative compounds are also applicable, except that for cooling emissive compounds, the emissivity of the selected compound is greater than the emissivity of the mold. Black or green silicon carbide having a particle size in the range of about minus 200 to about minus 325 is preferred.

If silicon carbide is used, either black or green silicon carbide may be employed. However, sometimes molds are kept overnight at high temperatures after the pattern has been vaporized. If this occurs certain emissive compounds, whether insulative or cooling may oxidize. Therefore, the addition of an agent that retards oxidation is useful. In the case of green silicon carbide, iron oxide may be added. If black silicon carbide is employed, it may not be necessary to add iron oxide, as black silicon carbide generally contains iron oxide as an impurity.

A low temperature glass-forming material may be included in the cooling emissive composition to help aid in the adhesion of the emissive compound to the surface of the casting shell. A low temperature glass-forming material is an inorganic compound or mixture that will fuse at relatively low temperatures and solidify to form a glass phase when cooled rapidly. Because the low temperature glass-forming materials melt or become viscous fluids at the temperatures used in the investment casting process, low temperature glass-forming materials flow more easily onto the surface of the casting shell than the solid emissive compounds. Also, a low temperature glass-forming material is useful to help prevent cracking and spalling of the emissive coating by providing room for the thermal expansion and contraction of the other components of the emissive composition. A nonlimiting example of a preferred low temperature glass-forming compound is sodium hexametaphosphate.

The cooling emissive composition also comprises a solvent in an amount sufficient to form a slurry having the rheology desired for application to the investment casting mold as described above.

A low temperature glass-forming material may also be included in an insulative emissive composition, and is particularly preferred when magnesium hydroxide is used because when magnesium hydroxide is heated it dehydrates to magnesium oxide and gives off steam. The low temperature glass-forming material provides for better release of the steam. Preferably, in either a cooling or an insulative composition, the low temperature glass-forming material is present in the range of about 0.5% to about 5% by weight of the entire composition, and more preferably in the range of about 2% to about 4% by weight of the entire composition.

The cooling compositions may optionally include a high-temperature glass-forming material as described above.

Both insulative and cooling emissive compositions may also comprise binder materials, suspending agents, biocides, organic dispersants and synthetic rubber-based polymers.

A binder may be included in an emissive composition. A binder is useful to help the composition adhere to the shell and to provide for binding between the components of the slurry after it is applied to the mold. Clay is a preferred binder. Preferably, the binder is present in the composition in an amount in the range of about 1% to about 10% by weight of the entire composition. More preferably, the binder is present in the composition in the range of about 2% to about 4% by weight of the entire composition. Bentonitc and kaolinitic ball clay are the preferred clays.

A suspending agent may also be included in an emissive composition. The clays, which are binders, can also be used as suspending agents. A preferred suspending agent is bentonitc clay, which may be present in the composition at about 0.3 percent by weight of the entire composition. Another preferred suspending agent is xanthan gum, which may be present in the composition at about 0.2 percent of the entire composition.

A biocide may be added to an emissive composition to prevent biological growth in the composition. Any biocide may be used that does not detrimentally interact with the emissive composition or the investment casting shell. The biocides Grotan TM and Duracool 645 TM, commercially available from the Nalco Chemical Company, in the amount of 0.2 percent by weigh of the entire composition have proven effective. Generally, the biocide chosen will vaporize almost completely when the shell is heated before the metal is introduced into the casting mold. A biocide is particularly preferred when xanthan gum is present in the composition as xanthan gum is susceptible to microbial attack.

Organic dispersants, such as salts of acrylic acids, or methacrylic acid can also be used in the emissive composition to stabilize the slurry.

The emissive compositions may also include a synthetic rubber-based polymer. The addition of a synthetic based rubber to an emissive composition helps to suspend particulate matter in the slurry and adhere the emissive composition to the shell. The addition of a synthetic rubber-based polymer also helps to reduce spalling and cracking of the coating at temperatures in excess of about 2000° F. (1,093° C.). The synthetic rubber-based polymer also strengthens the composition when it is applied to the mold. Latex polymers which are commercially available from the Nalco Chemical Company of Naperville, Ill., under the trade names Latrix 6300 TM and Latrix 6305 TM provide excellent performance. A rubber-based polymer is similar to natural rubber in properties and uses. A rubber based polymer is made by the polymerization of an unsaturated hydrocarbon such as butylene or isoprene or by the copolymerization of such hydrocarbons with styrene, butadiene or the like. Synthetic rubber-based polymers which are useful also, include, but are not limited to, styrene-butadiene latexes, acrylics and vinyl acetates. The preferred synthetic rubber-based polymer is a styrene-butadiene copolymer. Preferably, a synthetic rubber-based polymers is present in the range of about 2% to about 10% by weight of the entire composition. More preferably about 5% is used. Fused silica may also be added to the emissive compositions as a filler to increase the solids content of the slurry, to minimize cracking associated with the shrinkage of the composition when dried and cooled, and to reduce the thermal conductivity of the composition. It is preferred that fused silica be added to the composition in the form of an aqueous colloid having particles with effective diameters in the range of about 140 to 325 mesh. Nalcast P2 TM, commercially available from the Nalco Chemical Company, is an especially preferred source of fused silica. Fused silica is also a high temperature glass-forming material. Preferably, fused silica is present in the composition in the range of about 25% to about 50% by weight of the entire composition, preferably in the range of about 40% to about 50% and most preferably at about 44%. When magnesium hydroxide is present as the emissive compound, it is preferable that fused silica be present in the range of about 15% to about 25% by weight of the sum of the weight of the magnesium hydroxide and the silica. More preferably, the fused silica is present in the range of about 15% to about 18% by weight of the sum of the silica and the magnesium hydroxide in the composition. The above described emissive slurry compositions may be applied to the outside of an investment casting shell. The rheology of the slurry will depend on the method of application. Several methods of application of the slurry are available. For example, the slurry can be painted onto the mold. Alternatively, the mold may be dipped into the slurry, or the slurry may be sprayed onto the mold. In general, the slurry may be applied to the mold in any manner that will provide for the desired application at the desired location.

A unique feature of this invention is that the slurry composition may be applied selectively to different portions of a mold. Also, different emissivity compositions could be applied to different portions of the same mold. For example, one may wish to retard the cooling of a casting in a particular region of the mold and thus might apply an insulative composition to that portion of the mold. On the other hand, one may wish to speed cooling at another portion of the casting on the same mold, and thus apply a cooling emissive composition to that region.

The amount of solvent included in the composition should be adjusted to provide a slurry that may be applied by the desired method of application. As a rule of thumb, slurries in the range of from about one-half to one-third solvent are satisfactory for application by dipping. Such slurries usually produce a coating with a thickness in the range of about 0.01 (0.02 cm) to about 0.03 (0.08 cm) of an inch for each dip. A slurry having about 50% water by weight of the entire composition is usually satisfactory for application by dipping. The exact amount of solvent required, however, may vary depending on the components of the emissive composition.

This invention also provides a method of using an emissive composition. First, an investment casting mold or shell may be constructed by dipping and sieving as described above or by any other method used in the art. Next, an emissive composition is applied to at least a portion of the exterior of the investment casting mold. Application of the composition to the mold may be accomplished by spraying, painting or dipping. Dipping, however, is the preferred method. It is also recognized that it may be preferable to apply more than one coating to the investment casting mold. For example, when magnesium oxide is used as the low emissivity compound, more than one coating of the emissive composition may be desirable to obtain a smooth, uniform coating. The mold with the emissivity coating may then be heated to melt and vaporize the meltable pattern. At the elevated temperatures used to vaporize the meltable substrate, the ingredients of the composition may interact with each other and the surrounding atmosphere to produce the desired emissive coating.

Molten metal may then be introduced into the mold. Typically, the molten metal is in the range of about 2800° F. (1,538° C.) to about 3300° F. (1,816° C.). The mold containing the metal is then allowed to cool and the investment casting is removed from the mold. Generally, the removal of the investment casting from the mold destroys the mold and therefore investment casting molds are used only once.

During the vaporization step, any remaining solvent is vaporized, and preferably, in the case of magnesium oxide forming emissive compositions the "dry" emissive composition contains in the range of about 5% to about 25% by weight of the dry composition of magnesium oxide, and more preferably about 12% to about 15%. When the emissive composition comprises silicon carbide, the dry composition contains in the range of about 85% to about 99% by weight of the dry composition of silicon carbide. The dry composition may also include sodium oxide ($Na_2O$) present in the range of about 0.3% to about 3% by weight of the dry composition. Any sodium oxide is the residue of sodium hexametaphosphate or an equivalent low temperature glass-forming material which has been partially or fully oxidized on heating. Similarly, the coating may contain in the range of about 0.7% to about 7% by weight of the dry composition phosphorus pentaoxide ($P_2O_5$).

The following examples illustrate the invention disclosed and claimed in this application. These examples, however, are not intended to limit the scope of the disclosure or the claims.

EXAMPLES

Example 1

Four two-inch (5.1 cm) diameter polystyrene balls were mounted at the ends of four mullite robes. Each tube had an inside diameter of 5/16 (0.79 cm) of an inch, an outside diameter of 3/8 (0.95 cm) of an inch, and weighed about 16.5 grams. The tubes were utilized as handles for dipping the polystyrene balls to produce four substantially spherical ceramic shells.

Each of the shells was of layered construction, having two zircon primary coats under three fused silica backup coats. Three of the shells were given an emissivity coating as an outermost seal coat. Sphere A was given an additional coating of the fused silica backup slurry as a seal coat.

The seal coat for sphere B was a silicon carbide emissivity coating. It was applied as a slurry that contained 46.4% water by weight, 0.2% of a biocide, 0.2% of xanthan gum, 0.5% of bentonite clay, 3.1% of kaolinitic ball clay, 0.2% of sodium hexametaphosphate, 2.0% of a latex rubber polymer, and 47.4% of silicon carbide.

The seal coat for sphere C, a magnesium oxide coating, was similar to the coating described for sphere B, except that an equal weight of magnesium oxide was substituted for silicon carbide.

Sphere D had a seal coat which was identical with that of sphere C. However, a thin layer of finely divided alumina was first applied as an aqueous slurry to the surface of the shell. The seal coat was applied over the alumina layer.

After seal coating, the polystyrene was removed from all of the shells and a thermocouple was threaded lengthwise through each mullite tube until a tip of the thermocouple was located in approximately the center of the shell. Each of the shells was then placed in a furnace, heated to 2925° F. (1,607° C.), and removed from the furnace. Heating rates and cooling rates measured by the thermocouples were recorded by a strip-chart recorder. The heating and cooling rates of the coated shells are illustrated in the form of a bar chart in FIG. 1, normalized to account for slight differences in the mass of the shells.

Inspection of FIG. 1 reveals that shell B, coated with the slurry containing silicon carbide, heated and cooled more rapidly than did sphere A, which was coated with the fused silica slurry. It can also be seen that both of the spheres (C and D) coated with a slurry containing magnesium oxide heated more rapidly than did the sphere coated with silica. However, sphere C which contained the magnesium oxide seal coating in direct contact with the fused silica backup coat, cooled slightly faster than did the silica-coated sphere A. In contrast, sphere D which possessed an alumina barrier layer between the magnesium oxide and the fused silica backup, cooled more slowly than the silica-coated sphere A.

On examination of sphere C, it was found that the magnesium oxide coating applied directly over the fused silica backup had cracked severely during the heating and cooling cycle. It appears likely that the seal coat of sphere C was intact during most of the heating cycle, but that the cracks in the seal coat of sphere C interfered with its performance as an insulating coating during cooling.

Example 2

Three two-inch (5.1 cm) diameter wax cylinders, each 3.5 inches (8.9 cm) long, were dipped two times into the zircon primary coating described in Example 1 and three times into the fused silica backup coating of Example 1 to form open-ended cylindrical shells. The cylindrical shells were dewaxed in an autoclave, and then a special seal coating was applied to the outside surfaces of each of the cylindrical shells. The coating for cylinder A was an additional coating of the fused silica backup material. Cylinder B was coated with an aqueous slurry that containing 37.4% by weight of water, 0.2% of biocide, 0.3% of bentonite clay, 8.9% of silica fume, 4.2% of sodium hexametaphosphate, and 49.0% of magnesium hydroxide. The coating produced by heating the slurry of sphere B is termed the 96% magnesium hydroxide coating as it contains about 96% magnesium hydroxide by weight, with the balance being primarily silica.

Cylinder C was coated with an aqueous slurry containing 34.4% by weight of water, 0.2% of biocide, 0.3% of bentonite clay, 8.2% of fumed silica, 0.1% of xanthan gum, 3.9% of sodium hexametaphosphate, 9.8% of magnesium hydroxide, and 43.1% of fused silica. Upon heating, the slurry applied to cylinder C produced a coating that contained 18% of magnesium hydroxide, with the balance being primarily silica.

After coating, one thermocouple was cemented to each of the external circular surfaces of the open-ended cylindrical shells. Each of the cylindrical shells was then positioned partly through an opening in a furnace door, with the open ends of the cylindrical shells toward the inside of the furnace. The temperature inside the furnace was held at 2950° F. (1,621° C.). The thermocouples were used to record the temperature of the relatively cold, external, circular surfaces of the cylindrical shells as the shells were heated by radiant heat transfer from the inside of the furnace.

Figure 2:
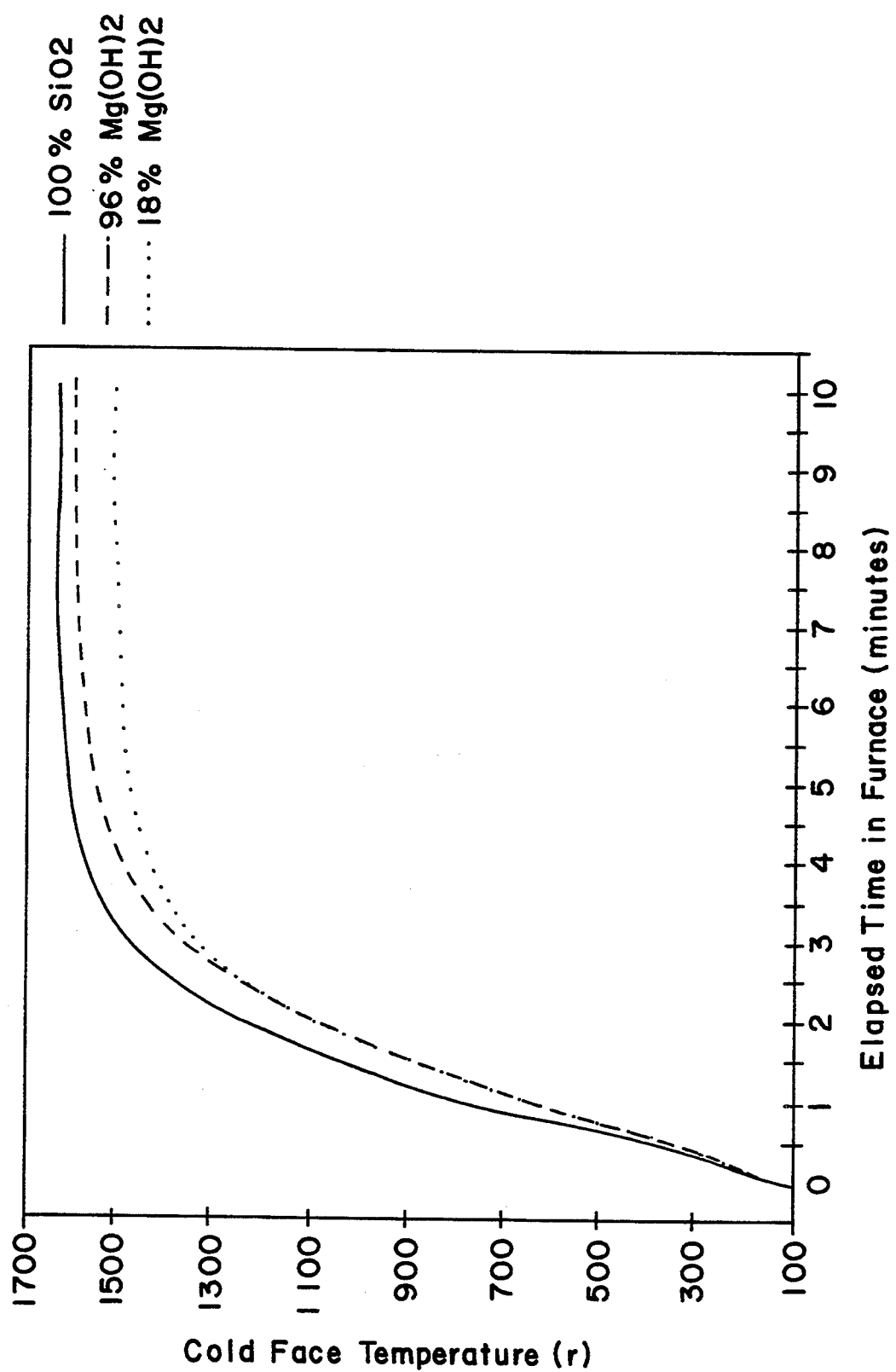
FIG. 2 is a graph that shows the relationship between a cold-face temperature, measured on a surface facing away from a heat source, and elapsed time in a furnace.

The temperatures recorded are plotted as a function of elapsed time in the furnace in FIG. 2. Cylinder A, having an external coating of 100% silica ($SiO_2$) exhibited the most rapid heating rate over an elapsed time period of from 0 to 10 minutes. Because the primary mode of heat transfer from the inside of the furnace and from particle to particle within each of the external coatings was radiant heat transfer, FIG. 2 indicates that the 100% silica coating on the external surfaces of cylinder A possessed a relatively high emissivity factor as compared to the three external coatings tested.

Thermal conduction within the coatings and through the shells is another important factor. After radiant absorption by the internal surface of the shells, the heat traveled through the cylindrical shells and coatings to the thermocouples by radiation and conduction and, thereafter, to the surrounding laboratory by radiation and convection. Since each of the three shells and thermocouples was fabricated identically and transferred heat equally well, except for the radiant and conductive transfer which occurred within the coatings, the relatively rapid rise in temperature exhibited by cylinder A demonstrates that the 100% silica ($SiO_2$) coating possessed the highest combination of emissivity factor and thermal conductivity of the three coatings tested.

Cylinder B, which was externally coated with the 96% magnesium hydroxide coating, exhibited the next highest heating rate. Cylinder C, having the 18% magnesium hydroxide coating, showed approximately the same rate of heating as the 96% magnesium hydroxide coating over the period of from 0 to about 2½ minutes, but heated least rapidly thereafter. Therefore, cylinder C having the 18% magnesium hydroxide coating demonstrated the lowest combination of emissivity factor and thermal conductivity of the three coatings.

Example 3

A third experiment was conducted to determine the effect of varying the proportion of magnesium hydroxide present in various magnesium hydroxide-fused silica coatings. Six cylindrical shells were fabricated as described in Example 2. The external surfaces of each of the cylindrical shells were coated with one of six magnesium hydroxide-fused silica slurries which, when heated, produced coatings having magnesium hydroxide contents that varied from 0% to 25%, in about 5% increments. As in Example 2, thermocouples were attached to the external circular surfaces of each of the cylindrical shells. Each of the shells was positioned to protrude though an opening in a furnace door, with the open side of the cylindrical shells facing the inside of the furnace. Temperatures measured at a relatively cold face toward the outside of the furnace are presented as functions of elapsed time in FIG. 3.

Figure 3:
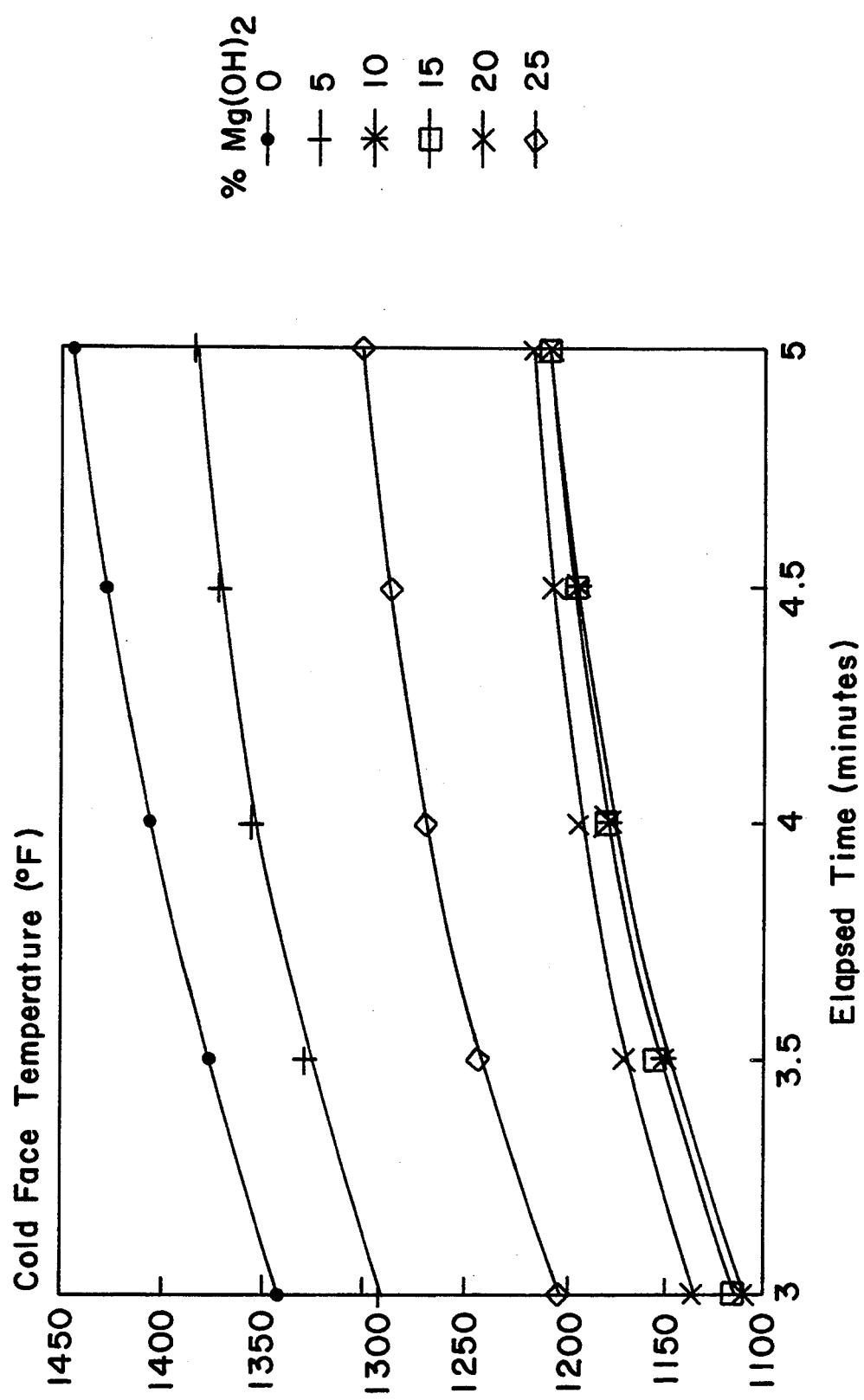
FIG. 3 is a graph that shows the relationship between a cold-face temperature and elapsed time in a furnace.

The data presented in FIG. 3, which relates to an elapsed time period of from 3 to 5 minutes, has been normalized to correspond to a total thickness of 0.235 inch (0.597 cm) including both a shell thickness and a coating thickness. The actual shell thicknesses ranged from 0.18 (0.457 cm) to 0.22 (0.56 cm) inch and the coating thicknesses were 0.010 (0.0254 cm) to 0.020 (0.0508 cm) inch.

As can be seen in FIG. 3, the lowest cold-faced heating rates were exhibited by the coatings having 10% and 15% magnesium hydroxide content, with the balance being silica. Additionally, the 20% magnesium hydroxide coating performed nearly as well. Thus, the data in FIG. 3 indicates the existence of an anomaly in magnesium hydroxide-silica coating compositions, with a minimum emissivity factor occurring in the range of from about 5% to about 25%, particularly in the range of from about 15% to about 25% by weight magnesium hydroxide.

Example 4

An experiment was conducted to determine the effect of multiple insulating coatings upon the cooling rates of spherical shells. Ceramic spherical shells were prepared which contained two coats of zircon and three backup coats of fused silica. A primary coat was applied by dipping polystyrene balls five times into a zircon slurry, each time draining 30 seconds between dips, and sprinkling the spheres with zircon granules. After application of the prime coat, the spheres were allowed to dry. A second coat was applied after the spheres had been pre-wet with binder and allowed 10 seconds to drain. The spheres were dipped five times in the zircon slurry, with 30 seconds for draining and a sprinkling of zircon particles after each dip. The spheres were allowed to dry after the application of the second coat.

Three backup coatings were applied over the second coating. In each case, the spheres were given five dips in an aqueous slurry of fused silica, with a 20 second drain period and a sprinkling of fused silica granules after each dip. The spheres were allowed to dry between backup coatings.

Sphere A was given an outermost seal coating of fused silica by dipping sphere A one time in the aqueous slurry of fused silica and allowing the sphere to dry. Spheres B and C were given one seal coat each of magnesium hydroxide by dipping the spheres once into an aqueous slurry containing magnesium hydroxide. Spheres D and E were given two outermost coats containing magnesium hydroxide by dipping each of the spheres into the magnesium hydroxide slurry two times, with a drying period between dips. Spheres F and G were given three coats each by dipping the spheres three times into the magnesium hydroxide slurry and drying the spheres between dips.

Except for sphere A, the same magnesium hydroxide slurry was used to apply the final seal coats of all of the spheres. The coating, called a 15% magnesium hydroxide coating, contained 32.4% by weight water, 0.2% of a biocide, 0.3% bentonite clay, 46.7% fused silica, 5.0% fumed silica, 0.1% xanthan gum, 2.0% sodium hexametaphosphate, 8.3 weight percent magnesium hydroxide, and 5.0% of a styrene-butadiene polymer. The thickness of an insulating coating produced by one dip in the 15% magnesium hydroxide solution produces a coating after firing was about 0.015 inch (0.0381 cm) in thickness.

Figure 4:
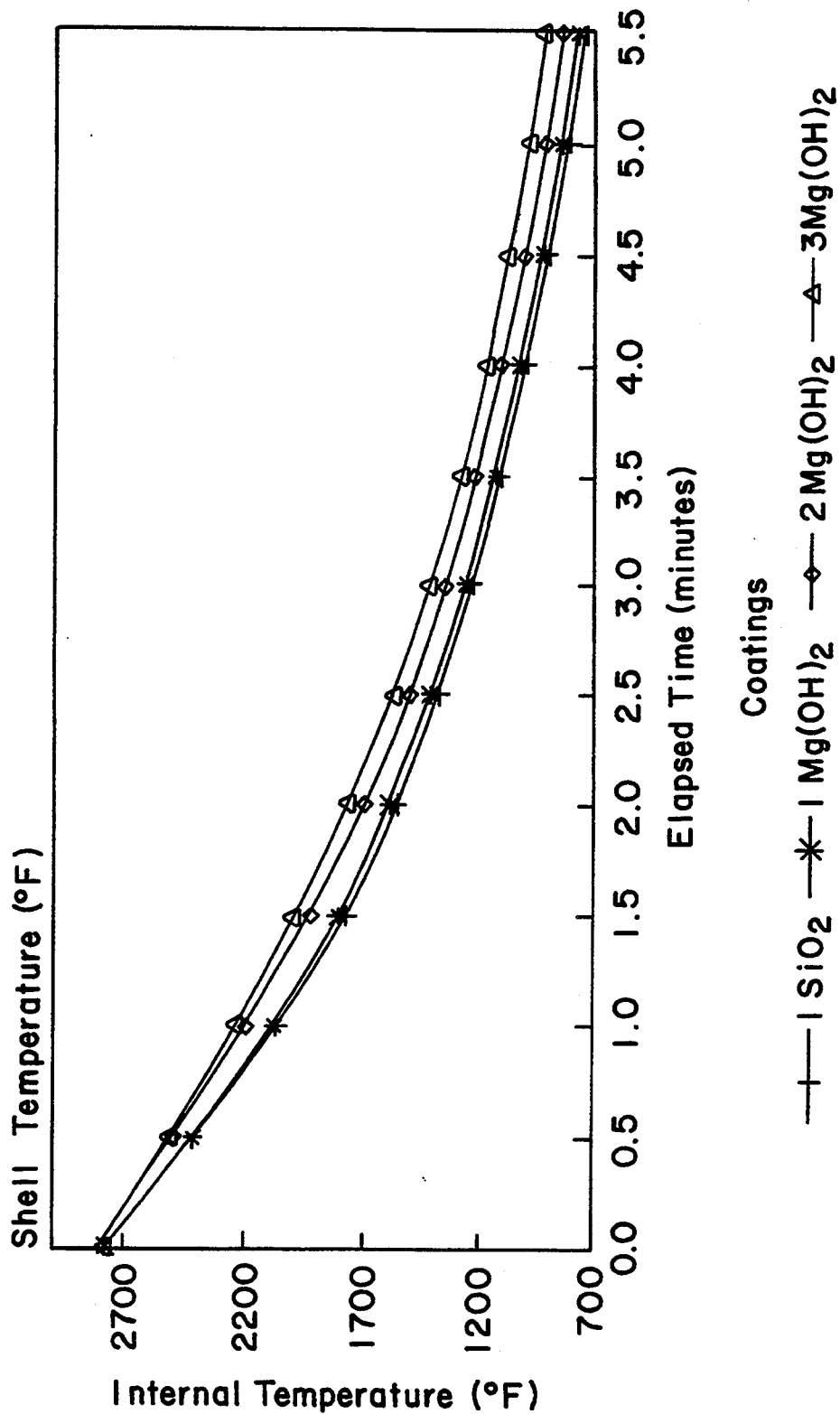
FIG. 4 is a graph that shows the relationship between internal temperature and elapsed time in a furnace for various coated ceramic spheres, some of the spheres having more than one insulating coating.

The spheres were fitted with mullite tubes and thermocouples as described in Example 1. The spheres were then placed in a furnace maintained at 2950° F. (1,621° C.), allowed to remain in the furnace for time periods which ranged from about 8 to about 11 minutes, withdrawn from the furnace, and allowed to cool by natural radiation and convection. Temperatures at the center of the spheres, as measured by the thermocouples, are graphed as functions of elapsed time in FIG. 4. Time zero for the graph is defined as the time during cooling at which the center temperature of each sphere passed 2700° F. (1482° C.).

All of the spheres with magnesium hydroxide coatings cooled more slowly than did the sphere which had an outermost coating of fused silica. Furthermore, each additional coating of magnesium hydroxide caused an additional decrease in the rate of cooling. The data presented in FIG. 4 suggests that one, or perhaps two, coatings of the 15% magnesium hydroxide slurry will suffice to decrease the rate of cooling of a ceramic shell in many practical applications.

I claim:

1. A composition for application to an investment casting mold that comprises:
   a compound selected from the group consisting of magnesium oxide, magnesium hydroxide, cerium oxide, calcium oxide, and yttrium, oxite in an amount in the range of about 5% to about 75% by weight of the entire composition;
   a high temperature glass-forming material in an amount in the range of about 1% to about 10% by weight of the entire composition; and
   a solvent in an amount sufficient to produce a slurry.

2. The composition of claim 1 that further comprises a low temperature glass-forming material.

3. The composition of claim 1 that further comprises a binder.

4. The composition of claim 1 that further comprises a suspending agent.

5. The composition of claim 1 that further comprises a synthetic rubber-based polymer.

6. An investment casting mold that has been at least partially coated with the composition of claim 1 or claim 7.

7. A composition for application to an investment casting mold that comprises:
   a compound selected from the group consisting of graphite, silicon carbide, silicon nitride, boron carbide, boron nitrides, and oxides of titanium, zirconium, iron, chromium, molybdenum, aluminum, nickel, copper and zinc, in an amount in the range of about 5% to about 75% by weight of the entire composition;

a low temperature glass-forming material in an amount in the range of about 1% to about 10% by weight of the entire composition; and a solvent in an amount sufficient to produce a slurry.

8. The composition of claim 7 that further comprises a high temperature glass-forming material.

9. The composition of claim 7 that further comprises a binder.

10. The composition of claim 7 that further comprises a suspending agent.

11. The composition of claim 7 that further comprises a synthetic rubber-based polymer.

12. An investment casting mold having a plurality of regions wherein at least one region of the mold is coated with the composition of claim 1 and at least one other region is coated with the composition of claim 7.

13. A method of investment casting comprising:
constructing a pattern from a meltable substrate;
forming a ceramic shell around the pattern;
applying an emissive composition to at least a portion the ceramic shell to form a coated shell;
vaporizing the pattern from the coated shell;
introducing molten metal into the coated shell;
cooling the coated shell containing the metal; and
removing the cooled metal from the shell to obtain an investment casting.

* * * * *